(12) United States Patent (10) Patent No.: US 8,935,223 B2
Ganesh et al. (45) Date of Patent: Jan. 13, 2015

(54) STRUCTURE OF HIERARCHICAL COMPRESSED DATA STRUCTURE FOR TABULAR DATA

(75) Inventors: Amit Ganesh, San Jose, CA (US); Vikram Kapoor, Cupertino, CA (US); Vineet Marwah, San Ramon, CA (US); Kam Shergill, Maidenhead (GB); Roger MacNicol, Hollis, NH (US); Sachin Kulkarni, Foster City, CA (US); Jesse Kamp, San Leandro, CA (US)

(73) Assignee: Oracle International Corporation, Redwood Shores, CA (US)

( * ) Notice: Subject to any disclaimer, the term of this patent is extended or adjusted under 35 U.S.C. 154(b) by 316 days.

(21) Appl. No.: 12/617,669

(22) Filed: Nov. 12, 2009

(65) Prior Publication Data

US 2010/0278446 A1 Nov. 4, 2010

Related U.S. Application Data

(60) Provisional application No. 61/174,447, filed on Apr. 30, 2009.

(51) Int. Cl.
*G06F 17/30* (2006.01)
*G06F 7/00* (2006.01)
(52) U.S. Cl.
CPC ................................ *G06F 17/30315* (2013.01)
USPC ............ 707/693; 707/717; 707/752; 707/769
(58) Field of Classification Search
None
See application file for complete search history.

(56) References Cited

U.S. PATENT DOCUMENTS 5,255,356 A * 10/1993 Michelman et al. .......... 715/217
5,263,145 A    11/1993 Brady et al.
5,404,510 A * 4/1995 Smith et al. ........................... 1/1
(Continued)

FOREIGN PATENT DOCUMENTS

WO    WO 2012/032184 A1    3/2012

OTHER PUBLICATIONS

Rabb, David, "How to Judge a Columnar Database", Information Management, website http://license.icopyright.net/user/viewFreeUse.act?fuid=MTMxMDAzMjU%3D, dated Dec. 14, 2007, 2 pages.

(Continued)

*Primary Examiner* — Jung Kim
*Assistant Examiner* — James J Wilcox
(74) *Attorney, Agent, or Firm* — Hickman Palermo Truong Becker Bingham Wong LLP; Justin R. Baratz

(57) ABSTRACT

A highly flexible and extensible structure is provided for physically storing tabular data. The structure, referred to as a compression unit, may be used to store tabular data that logically resides in any type of table-like structure. According to one embodiment, compression units are recursive. Thus, a compression unit may have a "parent" compression unit to which it belongs, and may have one or more "child" compression units that belong to it. In one embodiment, compression units include metadata that indicates how the tabular data is stored within them. The metadata for a compression unit may indicate, for example, whether the data is stored in row-major or column major-format, the order of the columns within the compression unit (which may differ from the logical order of the columns dictated by the definition of their logical container), a compression technique for the compression unit, the child compression units (if any), etc.

52 Claims, 7 Drawing Sheets

(56) References Cited

U.S. PATENT DOCUMENTS

| | | | |
|---|---|---|---|
| 5,506,979 A | 4/1996 | Menon | |
| 5,546,575 A | 8/1996 | Potter et al. | |
| 5,699,457 A | 12/1997 | Adar et al. | |
| 5,710,909 A * | 1/1998 | Brown et al. | 711/170 |
| 5,794,229 A | 8/1998 | French et al. | |
| 5,867,723 A | 2/1999 | Chin et al. | |
| 5,995,080 A | 11/1999 | Biro | |
| 6,011,871 A * | 1/2000 | Xu | 382/240 |
| 6,061,763 A | 5/2000 | Rubin et al. | |
| 6,216,125 B1 | 4/2001 | Johnson | |
| 6,360,213 B1 * | 3/2002 | Wagstaff et al. | 1/1 |
| 6,643,633 B2 | 11/2003 | Chau et al. | |
| 6,959,300 B1 | 10/2005 | Caldwell et al. | |
| 7,076,108 B2 | 7/2006 | Huang et al. | |
| 7,079,056 B2 | 7/2006 | Weaver | |
| 7,188,116 B2 * | 3/2007 | Cheng | 707/692 |
| 7,190,284 B1 * | 3/2007 | Dye et al. | 341/51 |
| 7,225,249 B1 | 5/2007 | Barry et al. | |
| 7,469,266 B2 | 12/2008 | Gustavson et al. | |
| 7,496,586 B1 * | 2/2009 | Bonwick et al. | 1/1 |
| 7,496,589 B1 | 2/2009 | Jain et al. | |
| 7,552,130 B2 | 6/2009 | Cook et al. | |
| 7,552,218 B2 | 6/2009 | Kaluskar et al. | |
| 7,558,290 B1 * | 7/2009 | Nucci et al. | 370/477 |
| 7,565,346 B2 | 7/2009 | Fan et al. | |
| 7,587,430 B2 * | 9/2009 | Suzuki et al. | 1/1 |
| 7,693,325 B2 | 4/2010 | Pulla et al. | |
| 7,707,194 B2 | 4/2010 | Bresch et al. | |
| 7,720,878 B2 | 5/2010 | Caldwell et al. | |
| 7,882,122 B2 | 2/2011 | Wong | |
| 8,032,499 B2 * | 10/2011 | Faerber et al. | 707/693 |
| 8,073,777 B2 | 12/2011 | Barry et al. | |
| 8,099,440 B2 | 1/2012 | Johnson | |
| 8,203,972 B2 * | 6/2012 | Sauermann | 370/256 |
| 8,296,517 B2 | 10/2012 | Potapov | |
| 8,392,382 B2 * | 3/2013 | Marwah et al. | 707/693 |
| 8,583,692 B2 * | 11/2013 | Ganesh et al. | 707/796 |
| 8,645,337 B2 * | 2/2014 | Kapoor et al. | 707/693 |
| 2001/0038642 A1 | 11/2001 | Alvarez et al. | |
| 2003/0108248 A1 | 6/2003 | Huang et al. | |
| 2003/0212694 A1 | 11/2003 | Potapov et al. | |
| 2004/0033803 A1 | 2/2004 | Varonen et al. | |
| 2004/0117396 A1 * | 6/2004 | Avadhanam et al. | 707/101 |
| 2004/0139099 A1 | 7/2004 | Weaver | |
| 2005/0027729 A1 | 2/2005 | Kuchinsky et al. | |
| 2005/0086267 A1 * | 4/2005 | Avadhanam et al. | 707/104.1 |
| 2005/0210054 A1 | 9/2005 | Harris | |
| 2005/0216421 A1 | 9/2005 | Barry et al. | |
| 2005/0278324 A1 | 12/2005 | Fan et al. | |
| 2006/0100912 A1 | 5/2006 | Kumar et al. | |
| 2007/0109155 A1 | 5/2007 | Fallon | |
| 2007/0143248 A1 | 6/2007 | Uppala | |
| 2007/0203958 A1 | 8/2007 | Suzuki et al. | |
| 2008/0010240 A1 | 1/2008 | Zait | |
| 2008/0050025 A1 | 2/2008 | Bashyam et al. | |
| 2008/0071818 A1 | 3/2008 | Apanowicz et al. | |
| 2008/0098048 A1 | 4/2008 | Cao et al. | |
| 2008/0162523 A1 | 7/2008 | Kraus et al. | |
| 2008/0281784 A1 | 11/2008 | Zane et al. | |
| 2008/0294676 A1 * | 11/2008 | Faerber et al. | 707/102 |
| 2008/0294863 A1 | 11/2008 | Faerber et al. | |
| 2009/0006399 A1 | 1/2009 | Raman et al. | |
| 2009/0204626 A1 * | 8/2009 | Mustafa | 707/101 |
| 2009/0234823 A1 | 9/2009 | Wong | |
| 2009/0319536 A1 | 12/2009 | Parker et al. | |
| 2010/0030796 A1 | 2/2010 | Netz et al. | |
| 2010/0042587 A1 | 2/2010 | Johnson et al. | |
| 2010/0161567 A1 | 6/2010 | Makela | |
| 2010/0281004 A1 | 11/2010 | Kapoor et al. | |
| 2010/0281079 A1 | 11/2010 | Marwah et al. | |
| 2011/0029569 A1 | 2/2011 | Ganesh et al. | |
| 2011/0047330 A1 | 2/2011 | Potapov | |
| 2011/0295817 A1 | 12/2011 | Chandrasekar | |
| 2012/0054225 A1 | 3/2012 | Marwah et al. | |
| 2012/0117038 A1 * | 5/2012 | Ganesh et al. | 707/693 |
| 2012/0143833 A1 | 6/2012 | Ganesh et al. | |
| 2012/0173515 A1 | 7/2012 | Jeong et al. | |
| 2013/0036101 A1 | 2/2013 | Marwah | |
| 2014/0164696 A1 | 6/2014 | Potapov et al. | |

OTHER PUBLICATIONS

MacNicol Roger et al, "Sybase IQ Multiplex-Designed for Analytics", Proceedings of the 30$^{th}$ VLDB Conference, dated 2004, 4 pages.
Sybase IQ, "Administration Guide", Document ID: 35375-01-1121-02, dated Sep. 19, 1997, 426 pages.
Sybase IQ, "Gaining the Performance Edge Using a Column-Oriented Database Management System", 12 pages, dated Mar. 2009.
Sybase IQ, "An Advanced Columnar Data Warehouse Architecture", Winter Corporation, 17 pages, Dated Jun. 2010.
Winter Corporation, "Demonstrating Efficiency in Large-Scale Data Warehousing", A review of new TPC-H results for the Sun-Sybase IQ Platform, 20 pages, dated in 2003.
U.S. Appl. No. 11/875,642, filed Oct. 19, 2007 (27 pages).
Loshin, D., "Gaining the Performance Edge Using a Column-Oriented Database Management System" (2009) 12 pages.
"C-Store: A Column-Oriented DBMS" downloaded from the Internet Apr. 1, 2010 < http://db.csail.mit.edu/projects/cstore/#papers > 4 pages.
Stonebraker, M. et al., "C-Store: A Column-oriented DBMS", Proceedings of the 31$^{st}$ VLDB Conference, Trondheim, Norway 2005 (12 pages).
Abadi, D. et al., "Integrating Compression and Execution in Column-Oriented Database Systems" Sigmod 2006 (12 pages).
Dittrich et al., "Towards a One Size Fits All Database Architecture" Proceedings of the 5th Biennial Conference on Innovative Data Systems Research, dated Jan. 6, 2011, 4 pages.

* cited by examiner

TABLE 200

|  | A | B | C |
|---|---|---|---|
| R1 | IMAGE A1 | NAME1 | IMAGE C1 |
| R2 | IMAGE A2 | NAME2 | IMAGE C2 |
| R3 | IMAGE A3 | NAME3 | IMAGE C3 |
| R4 | IMAGE A4 | NAME4 | IMAGE C4 |
| R5 | IMAGE A5 | NAME4 | IMAGE C5 |
| R6 | IMAGE A6 | NAME6 | IMAGE C6 |
| R7 | IMAGE A7 | NAME7 | IMAGE C7 |
| R8 | IMAGE A8 | NAME8 | IMAGE C8 |
| R9 | IMAGE A9 | NAME9 | IMAGE C9 |
| R10 | IMAGE A10 | NAME10 | IMAGE C10 |

FIG. 2

STRUCTURE OF HIERARCHICAL COMPRESSED DATA STRUCTURE FOR TABULAR DATA

CROSS-REFERENCE TO RELATED APPLICATIONS; BENEFIT CLAIM

This application claims benefit of Provisional Application No. 61/174,447, filed Apr. 30, 2009, the entire contents of which is hereby incorporated by reference as if fully set forth herein, under 35 U.S.C. §119(e).

FIELD OF THE INVENTION

The present invention relates to tabular data and, more specifically, to storing tabular data in compression units.

BACKGROUND

Computers are used to store and manage many types of data. Tabular data is one common form of data that computers are used to manage. Tabular data refers to any data that is logically organized into rows and columns. For example, word processing documents often include tables. The data that resides in such tables is tabular data. All data contained in any spreadsheet or spreadsheet-like structure is also tabular data. Further, all data stored in relational tables, or similar database structures, is tabular data.

Logically, tabular data resides in a table-like structure, such as a spreadsheet or relational table. However, the actual physical storage of the tabular data may take a variety of forms. For example, the tabular data from a spreadsheet may be stored within a spreadsheet file, which in turn is stored in a set of disk blocks managed by an operating system. As another example, tabular data that belongs to a relational database table may be stored in a set of disk blocks managed by a database server.

How tabular data is physically stored can have a significant effect on (1) how much storage space the tabular data consumes, and (2) how efficiently the tabular data can be accessed and manipulated. If physically stored in an inefficient manner, the tabular data may consume more storage space than desired, and result in slow retrieval, storage and/or update times.

Often, the physical storage of tabular data involves a trade-off between size and speed. For example, a spreadsheet file may be stored compressed or uncompressed. If compressed, the spreadsheet file will be smaller, but the entire file will typically have to be decompressed when retrieved, and re-compressed when stored again. Such decompression and compression operations take time, resulting in slower performance.

The best compression/performance balance is particularly difficult to achieve when tabular data includes various different types of data items. For example, a spreadsheet may include some columns that contain character strings, some columns that contain images, and yet other columns that contain binary Yes/No indications. The character strings may be highly compressible using a particular compression technique, but applying the same compression technique to the other types of data in the spreadsheet may yield no benefit. On the other hand, the images contained in the spreadsheet may be highly compressible using a compression technique that yields no benefit when used on character strings. Under circumstances such as these, whether the user chooses to compress the spreadsheet file using one of the techniques, or not at all, the result is inevitably sub-optimal.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram of a table that is referred to in examples provided herein;

DETAILED DESCRIPTION

Figure 1:
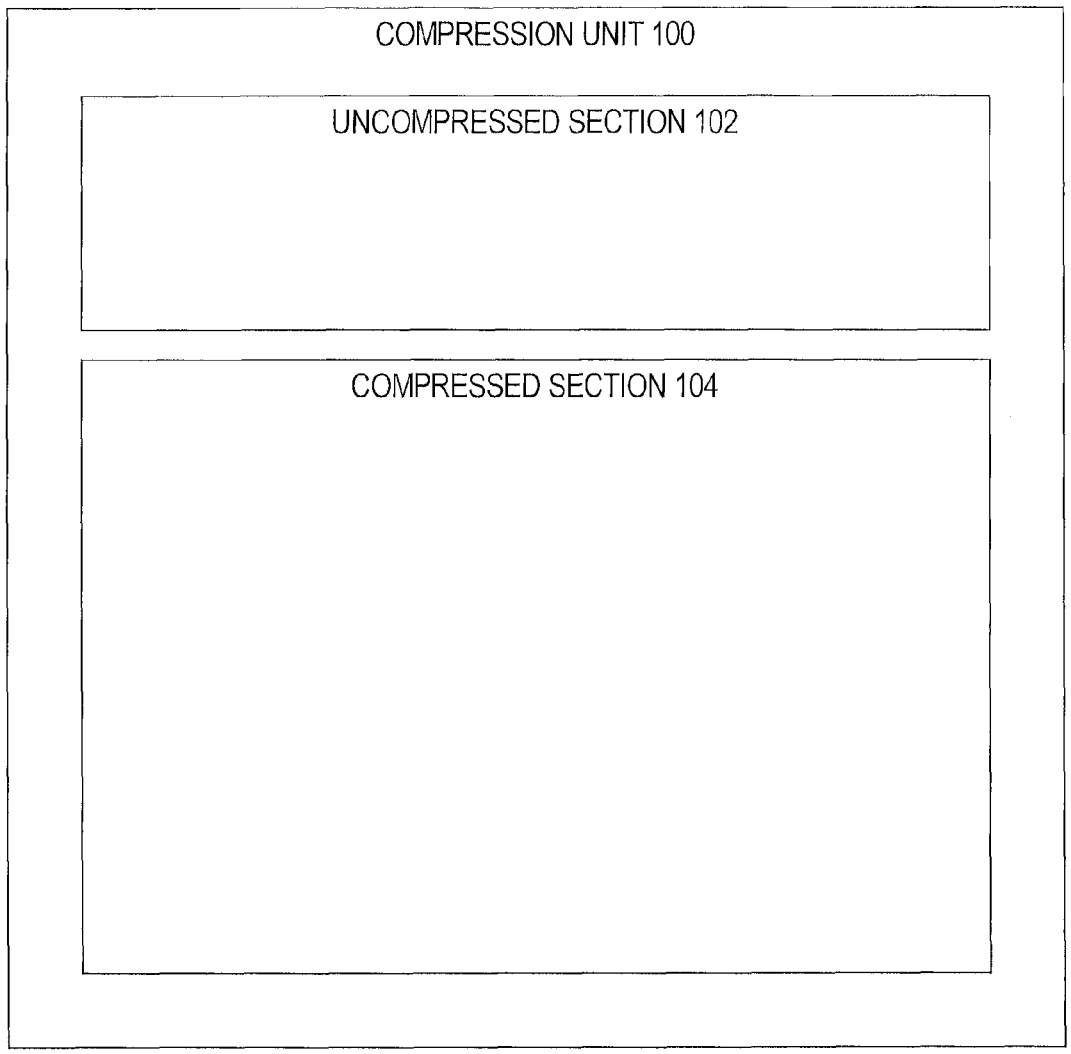
FIG. 1 is a block diagram of a compression unit, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A highly flexible and extensible structure is provided for physically storing tabular data. The structure, referred to herein as a "compression unit", may be used to physically store tabular data that logically resides in any type of table-like structure. For example, compression units may be used to store tabular data from spreadsheets, relational database tables, or tables embedded in word processing documents. There are no limits with respect to the nature of the logical structures to which the tabular data that is stored in compression units belongs.

According to one embodiment, compression units are recursive. Thus, a compression unit may have a "parent" compression unit to which it belongs, and may have one or more "child" compression units that belong to it. There is no limit to the number of recursive levels of compression units that may be used to store tabular data. For the purpose of explanation, a compression unit that has no parent is referred to herein as a "top-level" recursive unit, while a compression unit that has no children is referred to herein as a "bottom-level" compression unit.

According to one embodiment, each top-level compression unit stores data for all columns of the corresponding table. For example, if a table has twenty columns, then each top-level compression unit for that table will store data for different rows, but each of those rows will have data for all twenty columns. However, in alternative embodiments, even at the top-level, data from a table may be divided among compression units based on columns. Thus, some top-level compression units may store data for the first ten columns of a table, while other top-level compression units store data for the second ten columns of the table. In such an embodiment, a single row of the table may be spread among several top-level compression units.

In one embodiment, compression units include metadata that indicates how the tabular data is stored within them. The metadata for a compression unit may indicate, for example, whether the data within the compression unit is stored in row-major or column major-format (or some combination thereof), the order of the columns within the compression unit (which may differ from the logical order of the columns dictated by the definition of their logical container), a compression technique for the compression unit, the child compression units (if any), etc.

Techniques are also described hereafter for storing tabular data into compression units, retrieving data from compression units, and updating tabular data in compression units. According to one embodiment, techniques are employed to avoid changing tabular data within existing compression units. For example, deleting tabular data within compression units is avoided by merely tracking deletion requests, without actually deleting the data. As another example, inserting new tabular data into existing compression units is avoided by storing the new data external to the compression units. If the number of deletions exceeds a threshold, and/or the number of new inserts exceeds a threshold, new compression units may be generated. When new compression units are generated, the previously-existing compression units may be discarded to reclaim storage, or retained to allow reconstruction of prior states of the tabular data.

Compressed and Uncompressed Sections

FIG. 1 is a block diagram of a compression unit 100 according to one embodiment. In the embodiment illustrated in FIG. 1, compression unit 100 has two primary sections: an uncompressed section 102 and a compressed section 104. In general, the uncompressed section 102 includes metadata about the contents and format of the compressed section 104. Uncompressed section 102 may indicate, for example, what compression technique (if any) was used to compress the contents of the compressed section 104, and how the contents of uncompressed section 102 are organized.

For example, assume that compression unit 100 is used for storing tabular data from the table 200 that is illustrated in FIG. 2. Table 200 has three columns A, B, C and ten rows R1-R10. For the purpose of explanation, assume that all of the data from Table 200 is stored in compression unit 100, and that compression unit 100 is both a top-level compression unit (has no parent) and a bottom-level compression unit (has no children). Under these circumstances, the uncompressed section 102 of compression unit 100 may simply include:

an indication of the compression technique (if any) used to compress the contents of compressed section 104; and
  an indication that compression unit 100 is a bottom-level compression unit (and therefore has no children).

While these two pieces of information may be sufficient to allow use of compression unit 100, alternative embodiments include several additional pieces of metadata to provide greater flexibility and extensibility. For example, in one embodiment, within any compression unit, tabular data may be stored in column-major format or row-major format. When stored in row-major format, the tabular data would be stored within compressed section 104 in the sequence IMAGE1A, NAME1, IMAGE1C, IMAGE2A, NAME2, IMAGE2C, etc. On the other hand, when stored in column-major format, the tabular data would be stored within compressed section 104 in the sequence IMAGE1A, IMAGE2A, IMAGE3A . . . NAME1, NAME2, NAME3 . . . IMAGE1C, IMAGE2C, IMAGE 3C, etc. In an embodiment that allows the column-major/row-major selection to be made on a compression-unit-by-compression-unit basis, uncompressed section 102 may further include an indication of whether the tabular data contained in the compressed section 104 is stored in row-major or column-major format. In one embodiment, to conserve space, a compression unit does not include the names of the columns whose data is contained in the compression unit. Further, a compression unit may or may not store the rowids of the rows whose data is contained in the compression unit.

Recursive Structure

As mentioned above, embodiments shall be described herein in which compression units are recursive structures. Thus, a compression unit may have a parent compression unit and any number of child compression units. In the example given above, compression unit 100 did not have any child compression units. However, in situations in which compression unit 100 has child compression units, the compression unit 100 may include a header that has information about the child compression units. The header for compression unit 100 may be stored in the uncompressed section 102, or split between the uncompressed section 102 and the compressed section 104.

Figure 3:
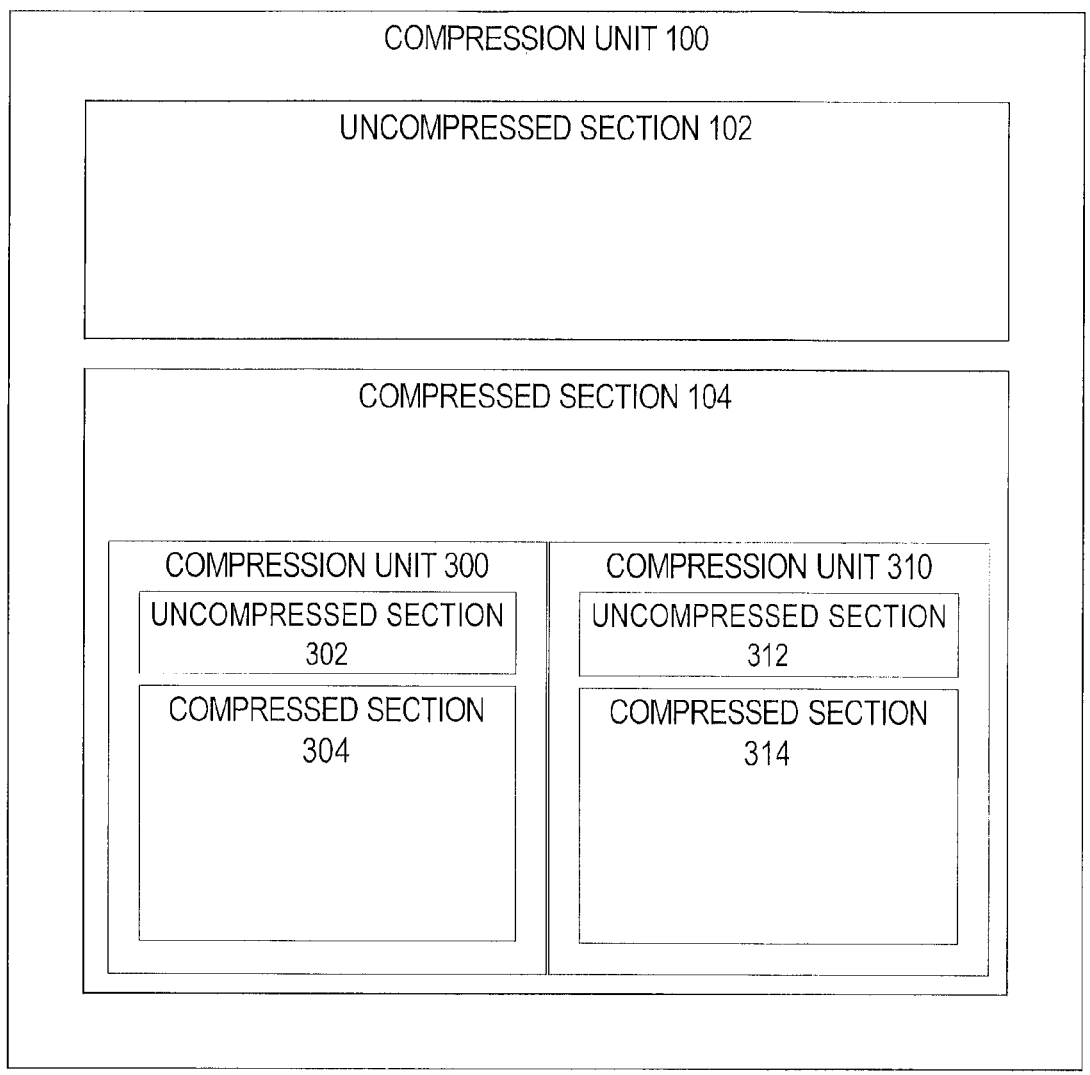
FIG. 3 is a block diagram showing two levels of compression units, according to an embodiment of the invention.

In the situation illustrated in FIG. 3, compression unit 100 has two child compression units 300 and 310. As illustrated, child compression units 300 and 310 have the same general structure as their parent compression unit 100. That is, similar to compression unit 100, child compression units 300 and 310 include uncompressed sections and compressed sections. Further, compression units 300 and 310 reside entirely within the compressed section 104 of their parent compression unit 100. Consequently, whatever compression is applied by to compressed section 104 at the level of compression unit 100 applies to the entirety of compression units 300 and 310.

Because the compression of parent compression units applies to the entirety of their child compression units, even the uncompressed sections 302 and 312 of child compression units may in fact be compressed. Thus, the "uncompressed" section of a compression unit is only uncompressed relative to the level in which the section resides (but may be compressed based on compression applied at higher level compression units). In contrast, the compressed section of a compression unit is compressed relative to the level in which the section resides (in addition to any compression applied at higher level compression units).

According to one embodiment, when compression unit 100 is the parent of one or more child compression units, the header of compression unit 100 includes additional information. For example, in one embodiment, the header of compression unit 100 indicates (a) an offset at which each child compression unit begins, and (b) which data is contained in each child compression unit.

For example, assume that a particular compression technique CT1 is particularly good at compressing images. Under these circumstances, it may be desirable to compress the images in columns A and C of table 200 using compression technique CT1, while compressing the strings of column B with a different compression technique CT2. To achieve this compression combination using the two child compression units 300 and 310, compression unit 300 may be used to store the images from columns A and C, while compression unit 310 is used to store the strings from column B. This distribution of data is illustrated in FIG. 4

Figure 4:
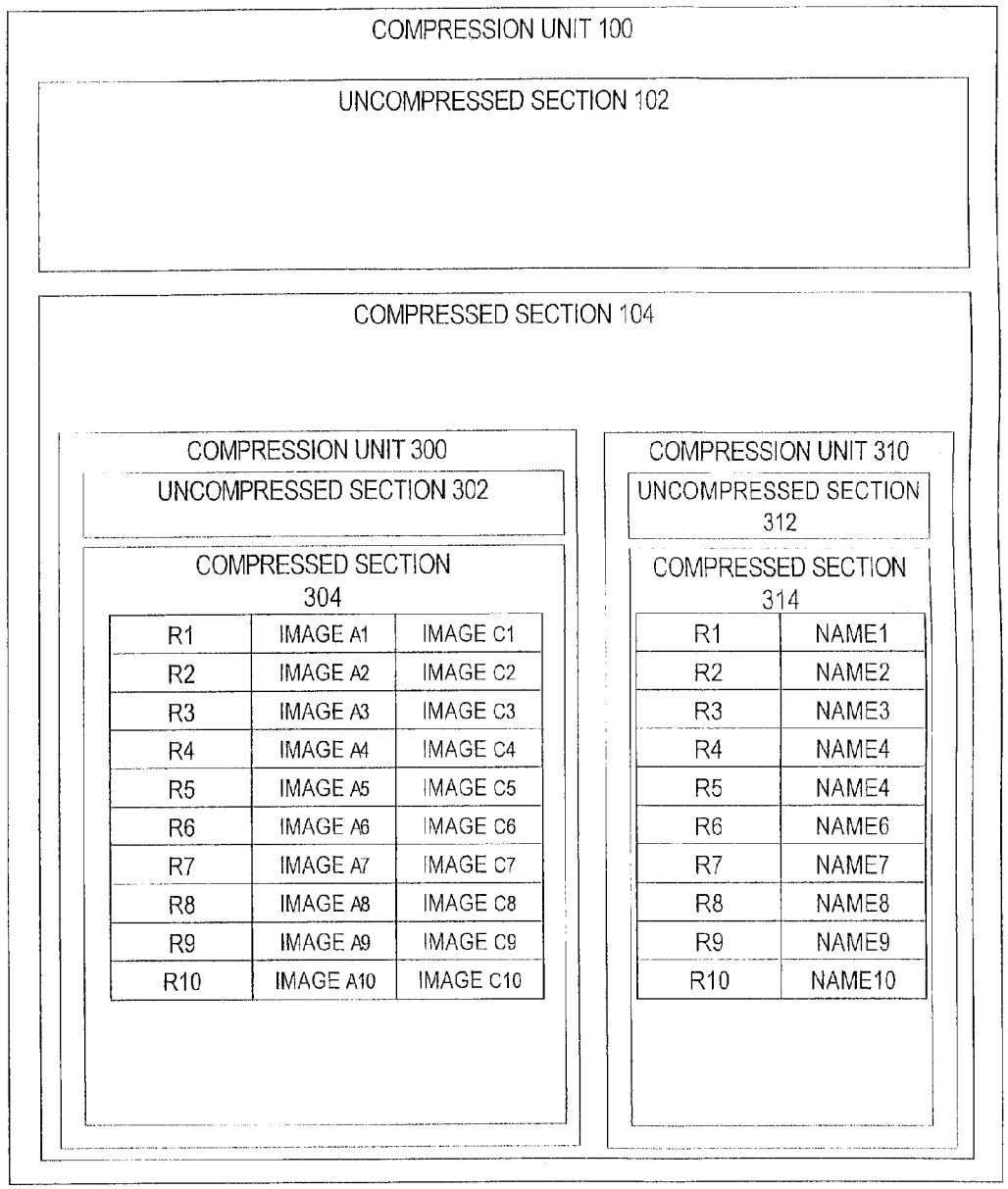
FIG. 4 is a block diagram showing how tabular data from the table illustrated in FIG. 2 may be stored in the compression units illustrated in FIG. 3.

According to one embodiment, to indicate the distribution of data illustrated in FIG. 4, the header of the parent compression unit 100 would indicate that the data within compressed section 104 is stored in column-major format, and that columns A and C are stored in compression unit 300 while column B is stored in compression unit 310. The uncompressed section 302 of compression unit 300, in turn, would indicate that compression technique CT1 applies to compressed section 304. Similarly, the uncompressed section 312 of compression unit 310 would indicate that compression technique CT2 applies to compressed section 314.

Figure 5:
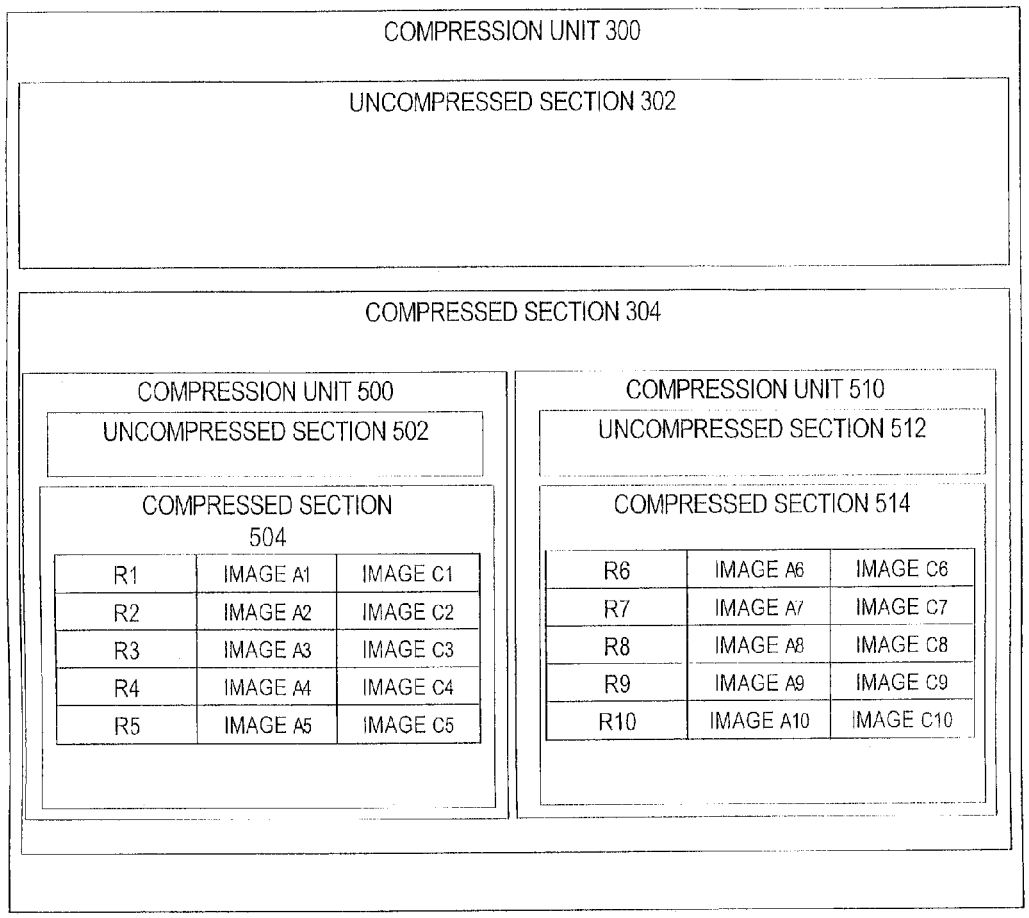
FIG. 5 is a block diagram illustrating how child compression units may themselves have child compression units, according to an embodiment of the invention.

Because of the recursive nature of compression units, the compression units 300 and 310 may themselves be parents to one or more child compression units. For example, in FIG. 5, compression unit 300 is shown as having two child compression units 500 and 510. Compression unit 500 stores the images from columns A and C for rows R1 to R5, while compression unit 510 stores the images from columns A and C for rows R6 to R10. Because the data within compressed portion 304 is distributed between compression units 500 and 510 based on rows, the uncompressed section 302 of compression unit 300 would indicate that, at the level of compression unit 300, the tabular data is organized in row-major format.

In this example, compression units 500 and 510 are bottom-level compression units that are two levels below the top-level compression unit 100. On the other hand, compression unit 310 is a bottom-level compression unit that resides one level below the top-level compression unit 100. Thus, in one embodiment, bottom-level compression units that store tabular data for the same table may be at different depths, depending on how the tabular data has been spread among compression units.

Metadata Describing Internal Organization of Compression Units

Because the information within compression units may be organized in a virtually infinite number of ways, metadata is maintained to indicate how each compression unit is organized. Depending on the implementation, the metadata about the organization of tabular data within a compression unit may be stored external to the compression unit, or within the compression unit. When stored within the compression unit, the metadata may be stored in the uncompressed section, the compressed section, or divided between both. The actual manner in which the metadata is stored may vary from implementation to implementation.

Figure 6:
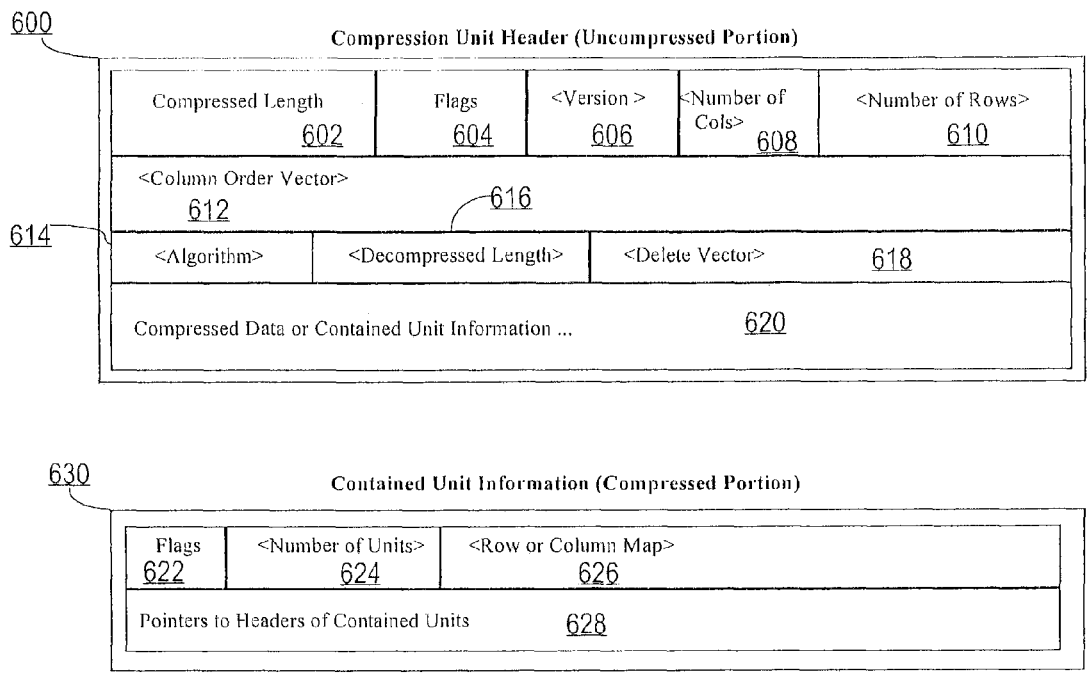
FIG. 6 is a block diagram illustrating how a compression unit header is split into two portions, one of which is uncompressed and one of which is compressed, according to an embodiment of the invention.

According to one embodiment, the metadata that describes the organization of tabular data within a compression unit is stored in a header within the compression unit, and includes both an uncompressed header portion 600 and a compressed header portion 630, as illustrated in FIG. 6. It should be understood that the embodiment illustrated in FIG. 6 is merely one example of how the uncompressed header portion 600 may be organized, and the types of metadata that the uncompressed header portion 600 may contain.

In the embodiment illustrated in FIG. 6, the initial "length" field 602 stores metadata that indicates the compressed size of the compression unit. In this context, the "compressed size" means the amount of storage occupied by the compression unit before any data contained there is decompressed. However, some compression units may not actually compress data. In such cases, the "compressed size" would be the same as the uncompressed size.

In the embodiment illustrated in FIG. 6, the length field 602 is followed by a series of flags 604. The flags 604 indicate whether or not the header contains certain fields. When the flag associated with a field indicates that the field is not present, then the field is either not relevant to the particular compression unit, or some "default" value is assumed for the field. The flags 604, and their corresponding fields, shall be discussed hereafter in greater detail.

Example Flags and Fields

According to one embodiment, flags 604 include a flag that indicates whether a version number field 606 is present in the header. The version number field 606 may be used in situations where the application that is managing the tabular structure (e.g. a spreadsheet program, word processor, or relational database system) supports versioning. In systems that support versioning, the version number field 606 is used to store a value that indicates the version of the tabular data contained within the compression unit. According to one embodiment, it is assumed that child compression units are associated with the same version as their parents, so the version number field 606 need only be used in top-level compression units.

In one embodiment, flags 604 include a flag indicates whether the compression unit includes fields relating to child compression units. In the embodiment illustrated in FIG. 6, such fields include the "contained unit information" stored within the compressed header portion 630. If a compression unit is a bottom-level compression unit, then the compression unit will not have any child compression units, and therefore will not have nor require any header fields relating to child compression units.

In one embodiment, flags 604 include a flag that indicates whether the header contains a column order vector 612. If the flag is false, then it is assumed that the columns are organized within the compression unit in the same column order as the "parent column order". For child compression units, the parent column order is the column order specified by its parent compression unit. For top-level compression units, the column order is the column order defined by the tabular structure itself.

For example, the column order defined for table 200 is A, B, C. Therefore, the parent column order for compression unit 100, which is a top-level compression unit, is A, B, C. If the column order flag for compression unit 100 is false, then it would be assumed that the column order within compression unit 100 is A, B, C. However, as illustrated in FIG. 4, within compression unit 100 the columns are ordered A, C, B (where columns A and C are stored in child compression unit 300. Thus, for compression unit 100, the column order flag would be true, and compression unit 100 would have a column order vector 612 to indicate that the mapping between the parent column order A, B, C and the new column order A, C, B.

The column order vector 612 may indicate the mapping between column orders in a variety of ways. According to one embodiment, the positions in the column order vector 612 correspond to the columns in the parent column order. Thus, the first, second and third positions within the column order vector 612 correspond to columns A, B, and C, respectively. However, the values stored at those positions in the column order vector 612 indicate the new order of the columns. For example, in the new column order (A, C, B) imposed by compression unit 100, column A is still the first column. Thus, the first position of the column order vector would store a "1".

On the other hand, in the new column order (A, C, B) imposed by compression unit 100, column B is now third in the sequence. Consequently, the second position in the column order vector 612 would store the value "3".

Finally, in the new column order (A, C, B) imposed by compression unit 100, column C is now second in the sequence. Consequently, the third position in the column order vector 612 would store the value "2".

Thus, the column order vector "1, 3, 2" within compression unit 100 would indicate that compression unit 100 has changed the order of the columns from the parent column order A, B, C, to the new column order A, C, B.

Metadata that remaps the parent column order in this manner is merely one example of metadata that may be used to indicate the column sequence used within a compression unit. Numerous alternatives may be used. For example, the header may simply store a sequence of column identifiers, where the column identifiers uniquely identify columns and the sequence of the identifiers indicates the sequence of the column data within the compression unit.

According to one embodiment, flags 604 include an "uncompressed" flag that indicates whether the unit is compressed or uncompressed. If the uncompressed flag is true, then the "compressed portion" of the compression unit is not actually compressed at the current level. However, as pointed out above, even an "uncompressed" compression unit may be compressed if it is the descendent of any compression unit that does apply compression. Similarly, an "uncompressed" compression unit may store data in child compression units that do apply compression. Thus, the uncompressed flag only indicates whether compression occurs relative to the level of the compression unit to which the flag belongs.

If the uncompressed flag is true, then the header of the compression unit will not have a compression algorithm field 614. On the other hand, if the uncompressed flag is false, then the header of the compression unit will include a compression algorithm field 614. When present, the compression algorithm field 614 indicates the compression algorithm that was used to compress the compressed section of the compression unit.

The compression algorithm used to compress the compressed section of a compression unit is distinct from any compression that may be applied by any parent compression unit, and from any compression that may be applied by any child compression unit. For example, the header of compression unit 100 may indicate that compression technique X was used to compress compressed section 104 of compression unit 100. The header of compression unit 300 may indicate that compression technique Y was used to compress compressed section 304 of compression unit 300. Finally, the header of compression unit 310 may indicate that the compressed section 314 of compression unit 310 is actually uncompressed. Under these conditions, the data within compressed section 304 will actually be double compressed, first as part of compressed section 304 using compression technique Y, and then as part of compressed section 104 using compression technique X.

In one embodiment, metadata indicating the decompressed length of compressed data is also stored in the header of the compression unit.

In one embodiment, flags 604 include a "number-of-columns" flag that indicates whether the unit contains information on the number of columns contained in the unit. The number-of-columns flag may be false, for example, if the compression unit has exactly the same number of columns as its parent. For top-level compression units, the number-of-columns flag may be false if the compression unit contains all of the columns of the spreadsheet and/or table for which the compression unit is storing tabular data.

In the example illustrated in FIG. 4, the number-of-columns flag of compression unit 100 would be false because compression unit 100 has all of the columns of table 200. However, the number-of-columns flag of compression units 300 and 310 would both be true, because they do not have the same number of columns as their parent compression unit 100.

In one embodiment, flags 604 include a number-of-rows flag that indicates whether the unit contains information on the number of rows contained within the compression unit. Similar to the number-of-columns flag, the number-of-rows flag may be false if (a) the compression unit stores all of the rows of its parent compression unit, or (b) the compression unit is a top-level compression unit that stores all of the rows of the spreadsheet and/or table for which the compression unit is storing tabular data.

In the example illustrated in FIG. 4, the number-of-rows flag of compression units 100, 300 and 310 would all be false, because all of them have all rows of table 200. However, in compression units 500 and 510 of FIG. 5, the number-of-rows flag would be true, because compression units 500 and 510 have subsets of the rows of their parent compression unit 300.

In one embodiment, flags 604 include a flag that indicates whether there is a delete vector field 618 in the header. As shall be described in greater detail hereafter, the delete vector field 618 may be used to store a delete vector that indicates that information has been deleted from the compression unit, without actually deleting the corresponding data.

In one embodiment, flags 604 include a checksum flag that indicates whether there are row checksums in the compression unit. Row checksums may be used to determine whether data has become corrupted. However, row checksums consume space, and therefore may be omitted under some situations or implementations.

In one embodiment, flags 604 are extensible. Consequently, new flags may be added to flags 604 as needed.

Contained Unit Information

If a compression unit contains no smaller units, then the (compressed) data for the unit is at the start of the compressed section of the unit, immediately following the compression unit header 600. On the other hand, if the compression unit does contain lower-level units, then instead of starting with the data, the compressed section of the unit starts with a (compressed) data structure with information on the contained units. One embodiment of such a contained units structure is illustrated in FIG. 6 as contained unit information 630.

In the illustrated embodiment, the contained unit information 630 starts with flags 622. In one embodiment, the first flag indicates whether the unit is divided based on rows or columns. The second flag indicates whether there is one column per unit. Thus, if contained unit information 630 is for a compression unit that contains three columns A, B and C, and each of the columns is in a different child compression unit, then the first flag of flags 622 would indicate that the data is divided based on columns, and the second flag of flags 622 would indicate that there is one column per child compression unit.

On the other hand, if contained unit information 630 is for a compression unit that contains three columns A, B and C, but columns A and C are in the same child compression unit, then the first flag of flags 622 would indicate that the data is divided based on columns, and the second flag of flags 622 would indicate that there is not one column per child compression unit.

In the illustrated embodiment, the flags 622 are followed by a number of units field 624. The number of units field 624 indicates the number of child compression units. While the illustrated embodiment includes a number of units field 624, such a field need not be present in alternative embodiments.

The number of units field 624 is followed by a map 626 either from rows to units, or from columns to units, depending on whether the data is divided by rows or by column. For example, map 626 for compression unit 100, illustrated in FIG. 4, would indicate that columns A and C are stored in child compression unit 300, and that column B is stored in child compression unit 310. On the other hand, map 626 for compression unit 300, illustrated in FIG. 5, would indicate that rows R1-R5 are stored in child compression unit 500, and that rows R6-R10 are stored in child compression unit 510.

According to one embodiment, in both column major and row major situations, the map 626 is a vector with length equal to the number of contained units. In one embodiment, each entry in the vector is the number of rows or columns in the corresponding child compression unit. Thus, if the column map has entries 2, 5 and 3, then the first unit contains the first two columns in the order specified previously in the header, and then the second unit contains the next five columns, and the third unit contains the next three columns. If there is one column per unit, then both the number of units and column mapping may be eliminated.

The contained unit information 630 concludes with pointers 628 to the headers of each of the contained compression units. According to one embodiment, these pointers are relative to the start of the uncompressed unit. The pointers are relative to the start of the uncompressed unit because, in order to make use of the contained unit information 630, including the pointers 628, the compressed section of the compression unit would have already been uncompressed.

Obtaining Tabular Data Stored in Compression Units

The recursive nature of compression units allows tabular data to be compressed at each of many levels. For example, within a bottom-level compression unit, data may be compressed using run-length encoding. That bottom-level compression unit may be a child of an intermediate-level compression unit that compresses the bottom-level compression unit (and everything else in its compressed section) using LZO compression. That intermediate-level compression unit may be a child of a top-level compression unit that compresses the intermediate-level compression unit (and everything else in its compressed section) using BZIP2 compression.

To obtain tabular data, the various compression operations have to be undone in reverse chronological order. In the example given above, the data must be decompressed using BZIP2 decompression, then decompressed using LZO decompression, and then uncompressed using run-length decoding. Because each decompression operation consumes resources, some operations may be performed directly on compressed data (without decompressing it). Eg: Run Length encoding. In situations where decompression is necessary, it is desirable to only perform the decompression operations necessary for any particular operation.

For example, assume that a request is made for the names associated with rows R1 to R10 of table 200. As illustrated in FIG. 4, those names are in column B, which is stored in child compression unit 310. Thus, to obtain the names, the compressed section 104 would be decompressed. Once decompressed, the contained unit information within compressed section 104 can be read to determine that column B is stored in compression unit 310. The pointer to compression unit 310 is follow to find the header for compression unit 310. The header, which is stored in uncompressed section 312, contains metadata that indicates how compressed section 314 was compressed. Compressed section 314 may then be uncompressed to obtain the names.

Significantly, during the process of obtaining the names from column B, the compressed section 304 of compression unit 300 was not uncompressed, because compressed section 304 did not have any data or metadata necessary to obtain the names from rows R1 to R10. Conversely, if the request was for images and not names, compressed section 304 of compression unit 300 would have to be decompressed, while compressed section 314 of compression unit 310 would not be decompressed.

Mixing Compressed and Uncompressed Data

According to one embodiment, the system may store data in compression units in uncompressed form or in compressed form. The system may, based on how many rows are in the compression unit, or based on the compressibility of the data, choose not to compress the compression unit.

According to one embodiment, a table may contain compression units and rows which are stored external to compression units. A row may be stored in conventional row-major disk blocks, or a row-based compression technique, such as the technique described in U.S. patent application Ser. No. 11/875,642 entitled "ON-LINE TRANSACTION PROCESSING (OLTP) COMPRESSION AND RE-COMPRESSION OF DATABASE DATA" filed on Oct. 19, 2007, the entire contents of which are incorporated herein by reference. When some tabular data for a table is stored in compression units, and other tabular data for the same table is stored external to compression units, the location of the data that is stored external to compression units is referred to herein as the "overflow area".

In one embodiment, in response to the data in the overflow area exceeding a particular threshold, the overflow data may be automatically moved into one or more new compression units. For example, several DML operations may result in the overflow area having thousands of rows. In response to detecting that the size of the data in the overflow area has exceeded some threshold, the data from the overflow may be repackaged into one or more new compression units. Similar to the bulk load situation, the new top-level compression units that are created to store the data from the overflow area may have the same internal structure as compression.

According to one embodiment, tabular data is deleted, inserted and updated directly into compression units, in response to operations performed on the corresponding table. In the case where the compression unit contains compressed data, performing such operations on the data itself, overhead is incurred due to the need to decompress the data before making the change, and then recompress the data after making the change. In the case where the compression unit contains uncompressed data, no such cost is incurred and the data may be acted upon directly.

Deleting Tabular Data Stored in Compression Units

In one embodiment, the delete vector in delete vector field 618 (illustrated in FIG. 6) is used to delete rows from a table without actually deleting, from the compression unit, the data that the rows contain. For example, assume that a particular compression unit stores data for 1000 rows. The corresponding delete vector may include 1000 bits, where the position of the bit indicates the row to which the bit corresponds. If a request is received to delete the $10^{th}$ row from the compression unit, then the $10^{th}$ bit of the delete vector is set to indicate that the corresponding row is deleted. However, the actual data for the $10^{th}$ row is not actually deleted from the compression unit.

Various benefits result from treating deletions in this manner. For example, by using the delete vector, deletions do not incur the overhead associated with decompressing the compressed section of a compression unit (and any lower-level compression units contained therein), because the delete vector is in the uncompressed section of the compression unit.

Further, the decompression overhead is not the only overhead avoided by using the delete vector. Specifically, if the compressed section was decompressed to remove the deleted row, then the compressed section would have to be recompressed after the row data was removed, thereby incurring more overhead. In addition, deletion of data from a compressed set of data may, under some circumstances, increase the compressed size of the data.

In one embodiment, rather than include a delete vector in the header of all compression units, the delete vector is only included at the top-level compression units. Inspection of the top-level delete vector indicates which rows have been deleted without having to access the headers of any lower-level compression units.

According to one embodiment, if the number of rows that are deleted exceeds a particular threshold, then the entire compression unit is rewritten. For example, if the bit vector indicates that more than some threshold percentage of the rows within a compression unit has been deleted, the compression unit may be decompressed, and the not-yet-deleted rows may be stored in a new compression unit. If there are sufficiently few rows remaining the system may store the compression unit in uncompressed form to avoid further overhead decompressing the compression unit. Alternatively, during this process, the data from many compression units may be combined into a new, smaller set of compression units which may be compressed.

Inserting Tabular Data

According to one embodiment, the insertion of data into a compression unit may be done directly. However, the addition of data into a compressed compression unit could incur significant overhead penalties, due to the decompression and recompression that would be required. Further, the resulting compression unit may be larger than desired. In the case that the compression unit contains data in uncompressed form, and the block contains sufficient space, the data may be inserted directly without such overhead.

According to one embodiment, newly added tabular data is not inserted into existing compression units. Instead, the newly added tabular data is either stored in the overflow area or stored in newly formed compression units which may be compressed or uncompressed depending on the amount of data inserted so far.

In one embodiment, if a small number of rows are being inserted into table 200, these rows may be stored external to compression units in the overflow area or they may be inserted into an uncompressed compression unit that has space available. If the insertion results in that compression unit exceeding some threshold, the system may compress the data in the compression unit.

In one embodiment, when the amount of data to be inserted into table 200 exceeds a threshold, then the data is not stored in the overflow area or existing uncompressed compression units. Rather, the new data is stored in new compression units. For example, if a bulk load operation is performed to add thousands of rows to table 200, then one or more new compression units may be created to store the tabular data for the new rows. According to one embodiment, the new top-level compression units would automatically inherit the same internal structure as compression unit 100, including the structure and organization of the compression units that descend from compression unit 100.

Updating Tabular Data

According to one embodiment, data may be updated directly within a compression unit. However, the addition of data into a compression unit could incur significant overhead penalties, due to the decompression and recompression that would be required. Further, the resulting compression unit may be larger than desired. In the case that the compression unit contains data in uncompressed form, and the block contains sufficient space, the data may be updated directly without such overhead.

According to one embodiment, updates are treated as deletions combined with inserts. Thus, when a value is updated in a row of table 200, the delete vector in compression unit 100 is updated to indicate that the row is deleted, and a row with the updated values is stored in the overflow area.

Frequently, there will be some columns of an updated row that are not changed by an update operation. Consequently, prior to storing the updated row in the overflow area, the compressed section of the compression unit (and any child compression units) may have to be decompressed to recover the pre-update values of the row. The new row stored in the overflow area includes the pre-update values of the columns of the row that were not changed, and new values for the columns of the row that were changed.

Reading Tabular Data

In an embodiment that uses an overflow area, table scans must read both the data that is stored in the overflow area, and the data that is stored in compression units. Thus, a single table scan may involve combining data from several differently organized compression units, from compressed data in the overflow area, and from uncompressed data in the overflow area.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
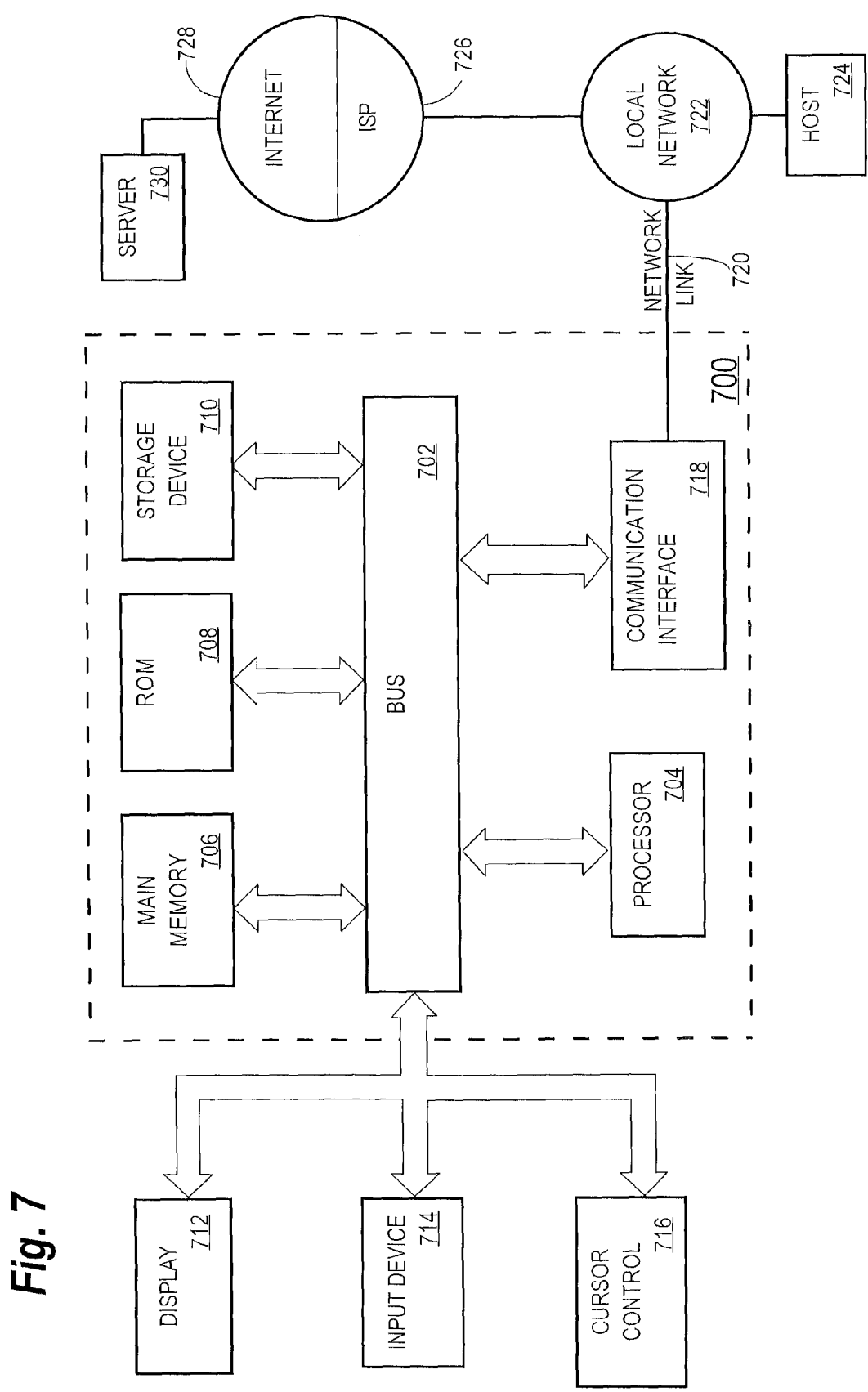
FIG. 7 is a block diagram of a computing device upon which embodiments of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a set of tabular data to populate a database table;
wherein the set of tabular data is divided into a plurality of rows in a particular row order, each of which includes data for a particular set of columns in a particular column order;
storing to a non-volatile storage, data for a first set of rows, of said plurality of rows, in a first compression unit, wherein the first set of rows is organized within the first compression unit in row-major format;
wherein the first set of rows includes a first row, a second row, and a third row;
wherein, within the particular row order, the first row precedes the second row, and the second row precedes the third row;
wherein the row-major format organization is such that
the entirety of the first row precedes the entirety of the second row,
the entirety of the second row precedes the entirety of the third row, and
within each of the first, second and third rows, each column is stored in the non-volatile storage according to the particular column order;
storing to the non-volatile storage, data for a second set of rows, of said plurality of rows, in a second compression unit, wherein the second set of rows is organized within the second compression unit in column-major format;
wherein the second set of rows include a fourth row, a fifth row, and a sixth row;
wherein the column-major format is such that
values for a first column of the fourth, fifth and sixth rows precede values for a second column of the fourth, fifth and sixth rows; and
values for the second column of the fourth, fifth and sixth rows precede values for a third column of the fourth, fifth and sixth rows; and
for each of the first, second and third columns, values for the column are stored in the non-volatile storage according to the particular row order;
wherein the first compression unit and the second compression unit are structures on the non-volatile storage for organizing the tabular data;
storing data that indicates whether, within said first compression unit, data for said first set of rows is stored in column-major format or in row-major format;
wherein the steps of receiving and storing are performed by one or more computing devices.

2. The method of claim 1 wherein:
the first compression unit has a first compressed section in which data is compressed using a first compression technique; and
the second compression unit has a second compressed section in which data is compressed using a second compression technique that is different from the first compression technique.

3. A method comprising:
receiving a set of tabular data to populate a database table;
wherein the set of tabular data is divided into a plurality of rows, each of which includes data for a particular set of columns;
storing to a non-volatile storage, data for said particular set of columns in a first compression unit;
wherein the first compression unit includes a plurality of child compression units, each of which stores data for a different one or more columns of the particular set of columns than other child compression units of the plurality of child compression units;
wherein the first compression unit includes a first set of columns of the particular set of columns and a second set of different columns of the particular set of columns; and
wherein the first set of columns is stored in a first child compression unit of the plurality of child compression units; and
wherein the second set of different columns is stored in a second child compression unit of the plurality of child compression units;
wherein the first child compression unit does not store any column of the second set of different columns and the second child compression unit does not store any column of the first set of columns;
wherein the first child compression unit is different than the second child compression unit;
storing metadata indicating that the first compression unit has children;
wherein the first compression unit and each child compression unit of the plurality of child compression units are structures on the non-volatile storage for organizing the tabular data; and
wherein the steps of receiving and storing are performed by one or more computing devices.

4. The method of claim 3 wherein:
the first child compression unit has a first compressed section in which data is compressed using a first compression technique; and
the second child compression unit has a second compressed section in which data is compressed using a second compression technique that is different from the first compression technique.

5. The method of claim 3 wherein the plurality of child compression units includes a child compression unit that contains a second plurality of child compression units.

6. The method of claim 3, wherein the metadata indicating that the first compression unit has children is stored within the first compression unit.

7. A method comprising:
receiving a set of tabular data for populating a database table;
wherein the set of tabular data is divided into a plurality of rows, each of which includes data for a particular set of columns;
storing to a non-volatile storage, data for said plurality of rows in a parent compression unit that includes a plurality of child compression units;
wherein the step of storing data in the parent compression unit includes either:
(a) dividing the data between the child compression units based on rows, whereby each child compression unit stores a different set of rows of the plurality of rows, wherein the parent compression unit stores a first set of rows of the plurality of rows and a second set of different rows of the plurality of rows, and the first set of rows is stored in a first child compression unit of the plurality of child compression units and the second set of rows is stored in a second child compression unit of the plurality of child compression units, wherein the first child compression unit does not store any row of the second set of different rows and the second child compression unit does not store any row of the first set of rows, wherein the first child compression unit is different than the second child compression unit; or (b) dividing the data between the child compression units based on columns, whereby each child compression unit stores a different set of columns of the particular set of columns, wherein the parent compression unit stores a first set of columns of the plurality of columns and a second set of different columns of the plurality of columns, and the first set of columns is stored in a third child compression unit of the plurality of child compression units and the second set of different columns is stored in a fourth child compression unit of the plurality of child compression units, wherein the third child compression unit does not store any column of the second set of different columns and the fourth child compression unit does not store any column of the first set of columns, wherein the third child compression unit is different than the fourth child compression unit;

storing metadata indicating whether or not each compression unit of the parent compression unit and the plurality of child compression units has children;

wherein the parent compression unit and each child compression unit of the plurality of child compression units are structures on the non-volatile storage for organizing the tabular data; and wherein steps of receiving and storing are performed by one or more computing devices.

8. The method of claim 7 wherein the step of storing data in the parent compression unit includes dividing the data between the child compression units based on rows, whereby each child compression unit stores a different set of rows of the plurality of rows.

9. The method of claim 7 wherein the step of storing data in the parent compression unit includes dividing the data between the child compression units based on columns, whereby each child compression unit stores a different set of columns of the particular set of columns.

10. The method of claim 5 wherein:
the set of tabular data is tabular data for a table;
within the table, the particular set of columns has a first particular order;
within the parent compression unit, data for the set of columns is stored in a second particular order that is different than said first particular order; and
the parent compression unit includes metadata identifying the second particular order.

11. The method of claim 7 wherein:
the parent compression unit includes a compressed section and an uncompressed section;
the plurality of child compression units are stored in the compressed section of the parent compression unit; and
data within the compressed section of the parent compression unit is compressed using a first compression technique.

12. The method of claim 11 wherein:
the first child compression unit includes a compressed section; and
data within the compressed section of the first child compression unit is compressed using a second compression technique that is different from said first compression technique.

13. The method of claim 12 wherein:
the second child compression unit includes a compressed section; and
data within the compressed section of the second child compression unit is compressed using a third compression technique that is different from said first compression technique and said second compression technique.

14. The method of claim 7 wherein:
the first child compression unit includes a compressed section; and
data within the compressed section of the first child compression unit is compressed using a first compression technique;
the second child compression unit includes a compressed section; and
data within the compressed section of the second child compression unit is compressed using a second compression technique that is different from said first compression technique.

15. The method of claim 7 wherein:
data within the first child compression unit is stored in row-major format; and
data within the second child compression unit is stored in column-major format.

16. The method of claim 15 wherein the compressed section includes pointers to where each child compression unit will begin after the compressed section is decompressed.

17. The method of claim 7 wherein:
the parent compression unit includes an uncompressed section and a compressed section;
the uncompressed section includes metadata that indicates a compression technique that was used to compress data in the compressed section; and
the plurality of child compression units are in the compressed section.

18. The method of claim 17 wherein the compressed section includes a map that indicates either (a) how many columns are in each child compression unit, or (b) how many rows are in each child compression unit.

19. The method of claim 7 wherein the parent compression unit includes a flag that indicates that the parent compression unit is not a bottom-level compression unit.

20. The method of claim 7 wherein:
columns are organized in the parent compression unit in a parent column order, and
at least one of the plurality of child compression units includes a flag that indicates whether columns in the child compression unit are organized in the same order as the parent column order.

21. The method of claim 7, wherein each compression unit of the parent compression unit and the child compression units stores a flag that indicates whether the compression unit has children.

22. A method comprising:
storing to a non-volatile storage, within a compression unit, data that logically belongs to a row of a table;
wherein at least a portion of the data is compressed; and
in response to a request to delete the row from the table, storing to the non-volatile storage metadata that indicates the row is deleted without deleting the data for the row from the compression unit;
in response to a request to perform an operation while the data for the row is still in the compression unit, determining that the metadata indicates that the row is deleted and performing the operation as though the row were deleted;

in response to a determination that the number of deleted rows of the compression unit exceeds a threshold, repackaging data from the compression unit into one or more new compression units;

wherein the compression unit and each of the one or more new compression units are data structures on the non-volatile storage for organizing the data that logically belongs to the row of the table;

wherein the method is performed by one or more computing devices.

23. The method of claim 22 further comprising, in response to a request to store data in the table, storing the data in an overflow area external to the compression unit.

24. The method of claim 23 further comprising repackaging data from the overflow area into one or more compression units in response to the amount of data in the overflow area exceeding a threshold.

25. The method of claim 22 wherein the step of storing metadata that indicates the row is deleted includes changing a bit, within a delete vector, that corresponds to the row.

26. The method of claim 25 wherein the delete vector is stored within an uncompressed section of the compression unit.

27. A non-transitory computer-readable storage medium storing instructions which, when executed by one or more processors, cause performance of:

receiving a set of tabular data to populate a database table;
wherein the set of tabular data is divided into a plurality of rows in a particular row order, each of which includes data for a particular set of columns in a particular column order;
storing to a non-volatile storage, data for a first set of rows, of said plurality of rows, in a first compression unit, wherein the first set of rows is organized within the first compression unit in row-major format;
wherein the first set of rows includes a first row, a second row, and a third row;
wherein, within the particular row order, the first row precedes the second row, and the second row precedes the third row;
wherein the row-major format organization is such that
the entirety of the first row precedes the entirety of the second row,
the entirety of the second row precedes the entirety of the third row, and
within each of the first, second and third rows, each column is stored in the non-volatile storage according to the particular column order;
storing to the non-volatile storage, data for a second set of rows, of said plurality of rows, in a second compression unit, wherein the second set of rows is organized within the second compression unit in column-major format;
wherein the second set of rows include a fourth row, a fifth row, and a sixth row;
wherein the column-major format is such that
values for a first column of the fourth, fifth and sixth rows precede values for a second column of the fourth, fifth and sixth rows; and
values for the second column of the fourth, fifth and sixth rows precede values for a third column of the fourth, fifth and sixth rows; and
for each of the first, second and third columns, values for the column are stored in the non-volatile storage according to the particular row order;
wherein the first compression unit and the second compression unit are structures on the non-volatile storage for organizing the tabular data;
storing data that indicates whether, within said first compression unit, data for said first set of rows is stored in column-major format or in row-major format.

28. The non-transitory computer-readable storage medium of claim 27 wherein:
the first compression unit has a first compressed section in which data is compressed using a first compression technique; and
the second compression unit has a second compressed section in which data is compressed using a second compression technique that is different from the first compression technique.

29. A non-transitory computer-readable storage medium storing instructions which, when executed by one or more processors, cause performance of:
receiving a set of tabular data to populate a database table;
wherein the set of tabular data is divided into a plurality of rows, each of which includes data for a particular set of columns;
storing to a non-volatile storage, data for said particular set of columns in a first compression unit;
wherein the first compression unit includes a plurality of child compression units, each of which stores data for a different one or more columns of the particular set of columns than other child compression units of the plurality of child compression units;
wherein the first compression unit includes a first set of columns of the particular set of columns and a second set of different columns of the particular set of columns and the first set of columns is stored in a first child compression unit of the plurality of child compression units and the second set of different columns is stored in a second child compression unit of the plurality of child compression units;
wherein the first child compression unit does not store any column of the second set of different columns and the second child compression unit does not store any column of the first set of columns;
wherein the first child compression unit is different than the second child compression unit;
storing metadata indicating that the first compression unit has children;
wherein the first compression unit and each child compression unit of the plurality of child compression units are structures on the non-volatile storage for organizing the tabular data.

30. The non-transitory computer-readable storage medium of claim 29 wherein:
the first child compression unit has a first compressed section in which data is compressed using a first compression technique; and
the second child compression unit has a second compressed section in which data is compressed using a second compression technique that is different from the first compression technique.

31. The non-transitory computer-readable storage medium of claim 29 wherein the plurality of child compression units includes a child compression unit that contains a second plurality of child compression units.

32. The non-transitory computer-readable storage medium of claim 29, wherein the metadata indicating that the first compression unit has children is stored within the first compression unit.

33. A non-transitory computer-readable storage medium storing instructions which, when executed by one or more processors, cause performance of:

receiving a set of tabular data for populating a database table;

wherein the set of tabular data is divided into a plurality of rows, each of which includes data for a particular set of columns;

storing to a non-volatile storage, data for said plurality of rows in a parent compression unit that includes a plurality of child compression units;

wherein the step of storing data in the parent compression unit includes either:

(a) dividing the data between the child compression units based on rows, whereby each child compression unit stores a different set of rows of the plurality of rows, wherein the parent compression unit stores a first set of rows of the plurality of rows and a second set of different rows of the plurality of rows, and the first set of rows is stored in a first child compression unit of the plurality of child compression units and the second set of rows is stored in a second child compression unit of the plurality of child compression units, wherein the first child compression unit does not store any row of the second set of different rows and the second child compression unit does not store any row of the first set of rows, wherein the first child compression unit is different than the second child compression unit; or (b) dividing the data between the child compression units based on columns, whereby each child compression unit stores a different set of columns of the particular set of columns, wherein the parent compression unit stores a first set of columns of the plurality of columns and a second set of different columns of the plurality of columns, and the first set of columns is stored in a third child compression unit of the plurality of child compression units and the second set of different columns is stored in a fourth child compression unit of the plurality of child compression units, wherein the third child compression unit does not store any column of the second set of different columns and the fourth child compression unit does not store any column of the first set of columns, wherein the third child compression unit is different than the fourth child compression unit;

storing metadata indicating whether or not each compression unit of the parent compression unit and the plurality of child compression units has children;

wherein the parent compression unit and each child compression unit of the plurality of child compression units are structures on the non-volatile storage for organizing the tabular data.

34. The non-transitory computer-readable storage medium of claim 33 wherein the step of storing data in the parent compression unit includes dividing the data between the child compression units based on rows, whereby each child compression unit stores a different set of rows of the plurality of rows.

35. The non-transitory computer-readable storage medium of claim 33 wherein the step of storing data in the parent compression unit includes dividing the data between the child compression units based on columns, whereby each child compression unit stores a different set of columns of the particular set of columns.

36. The non-transitory computer-readable storage medium of claim 35 wherein:

the set of tabular data is tabular data for a table;

within the table, the particular set of columns has a first particular order;

within the parent compression unit, data for the set of columns is stored in a second particular order that is different than said first particular order; and the parent compression unit includes metadata identifying the second particular order.

37. The non-transitory computer-readable storage medium of claim 33 wherein:

the parent compression unit includes a compressed section and an uncompressed section;

the plurality of child compression units are stored in the compressed section of the parent compression unit; and data within the compressed section of the compression unit is compressed using a first compression technique.

38. The non-transitory computer-readable storage medium of claim 37 wherein:

the first child compression unit includes a compressed section; and data within the compressed section of the first child compression unit is compressed using a second compression technique that is different from said first compression technique.

39. The non-transitory computer-readable storage medium storage of claim 38 wherein:

the second child compression unit includes a compressed section; and data within the compressed section of the second child compression unit is compressed using a third compression technique that is different from said first compression technique and said second compression technique.

40. The non-transitory computer-readable storage medium of claim 33 wherein:

the first child compression unit includes a compressed section; and data within the compressed section of the first child compression unit is compressed using a first compression technique;

the second child compression unit includes a compressed section; and data within the compressed section of the second child compression unit is compressed using a second compression technique that is different from said first compression technique.

41. The non-transitory computer-readable storage medium of claim 33 wherein:

data within the first child compression unit is stored in row-major format; and data within the second child compression unit is stored in column-major format.

42. The non-transitory computer-readable storage medium of claim 41 wherein the compressed section includes pointers to where each child compression unit will begin after the compressed section is decompressed.

43. The non-transitory computer-readable storage medium claim 33 wherein:

the parent compression unit includes an uncompressed section and a compressed section;

the uncompressed section includes metadata that indicates a compression technique that was used to compress data in the compressed section; and the plurality of child compression units are in the compressed section.

44. The non-transitory computer-readable storage medium claim 43 wherein the compressed section includes a map that indicates either (a) how many columns are in each child compression unit, or (b) how many rows are in each child compression unit.

45. The non-transitory computer-readable storage medium of claim 33 wherein the parent compression unit includes a flag that indicates that the parent compression unit is not a bottom-level compression unit.

46. The non-transitory computer-readable storage medium of claim 33 wherein:
  columns are organized in the parent compression unit in a parent column order, and
  at least one of the plurality of child compression units includes a flag that indicates whether columns in the child compression unit are organized in the same order as the parent column order.

47. The non-transitory computer-readable medium of claim 33, wherein each compression unit of the parent compression unit and the child compression units stores a flag that indicates whether the compression unit has children.

48. A non-transitory computer-readable storage medium storing instructions which, when executed by one or more processors, cause performance of:
  storing to a non-volatile storage, within a compression unit, data that logically belongs to a row of a table;
  wherein at least a portion of the data is compressed; and
  in response to a request to delete the row from the table, storing to the non-volatile storage metadata that indicates the row is deleted without deleting the data for the row from the compression unit;
  in response to a request to perform an operation while the data for the row is still in the compression unit, determining that the metadata indicates that the row is deleted and performing the operation as though the row were deleted;
  in response to a determination that the number of deleted rows of the compression unit exceeds a threshold, repackaging data from the compression unit into one or more new compression units;
  wherein the compression unit and each of the one or more new compression units are data structures on the non-volatile storage for organizing the data that logically belongs to the row of the table.

49. The non-transitory computer-readable storage medium of claim 48 further comprising instructions for, in response to a request to store data in the table, storing the data in an overflow area external to the compression unit.

50. The non-transitory computer-readable storage medium of claim 49 further comprising instructions for repackaging data from the overflow area into one or more compression units in response to the amount of data in the overflow area exceeding a threshold.

51. The non-transitory computer-readable storage medium of claim 48 wherein the step of storing metadata that indicates the row is deleted includes changing a bit, within a delete vector, that corresponds to the row.

52. The non-transitory computer-readable storage medium of claim 42 wherein the delete vector is stored within an uncompressed section of the compression unit.

* * * * *

UNITED STATES PATENT AND TRADEMARK OFFICE
CERTIFICATE OF CORRECTION

PATENT NO. : 8,935,223 B2  
APPLICATION NO. : 12/617669  
DATED : January 13, 2015  
INVENTOR(S) : Ganesh et al.

Page 1 of 1

It is certified that error appears in the above-identified patent and that said Letters Patent is hereby corrected as shown below:

In the specification

In column 4, line 10, delete "IMAGE 3C," and insert -- IMAGE3C, --, therefor.

In column 5, line 7, delete "FIG. 4" and insert -- FIG. 4. --, therefor.

In the claims

In column 17, line 47, in Claim 10, delete "claim 5" and insert -- claim 9 --, therefor.

In column 22, line 27, in Claim 39, before "of claim" delete "storage".

In column 22, line 57, in Claim 43, delete "medium" and insert -- medium of --, therefor.

In column 22, line 66, in Claim 44, delete "medium" and insert -- medium of --, therefor.

In column 23, line 17, in Claim 47, delete "medium" and insert -- storage medium --, therefor.

In column 24, line 27, in Claim 52, delete "claim 42" and insert -- claim 51 --, therefor.

Signed and Sealed this  
Twelfth Day of January, 2016

Michelle K. Lee  
*Director of the United States Patent and Trademark Office*